(12) United States Patent
Schneeberger (10) Patent No.: US 11,473,613 B1
(45) Date of Patent: Oct. 18, 2022

(54) SLIPPAGE FREE COMPACT REACTION WASHER BASED ACTUATION AND REACTION TORQUE TRANSFER SYSTEM WITH LOCK-ON CAPABILITY

(71) Applicant: Johannes P Schneeberger, Brisbane, CA (US)

(72) Inventor: Johannes P Schneeberger, Brisbane, CA (US)

( * ) Notice: Subject to any disclaimer, the term of this patent is extended or adjusted under 35 U.S.C. 154(b) by 275 days.

(21) Appl. No.: 16/679,827

(22) Filed: Nov. 11, 2019

Related U.S. Application Data (60) Provisional application No. 62/758,676, filed on Nov. 11, 2018.

(51) Int. Cl.
*B25B 23/14* (2006.01)
*B25B 13/06* (2006.01)
*F16B 43/00* (2006.01)
*F16B 23/00* (2006.01)
*F16B 39/24* (2006.01)

(52) U.S. Cl.
CPC .............. *F16B 43/00* (2013.01); *B25B 13/06* (2013.01); *B25B 23/14* (2013.01); *F16B 23/0061* (2013.01); *F16B 39/24* (2013.01)

(58) Field of Classification Search
CPC .... F16B 43/00; F16B 43/009; F16B 23/0061; F16B 39/24; B25B 29/00; B25B 29/02; B25B 23/0085; B25B 23/14; B25B 13/06; B25B 13/065; B25B 21/02; B25B 21/002
See application file for complete search history.

(56) References Cited

U.S. PATENT DOCUMENTS

| | | | | |
|---|---|---|---|---|
| 3,466,956 A * | 9/1969 | Bowers | .................. | B25B 13/065 81/124.6 |
| 8,978,520 B2 * | 3/2015 | Yoshimachi | ............ | B25B 13/06 81/57.36 |
| 9,770,815 B2 * | 9/2017 | Scrivens | .................. | B25B 13/06 |
| 10,442,059 B2 * | 10/2019 | Milligan | ............. | B25B 23/0035 |
| 10,596,685 B2 * | 3/2020 | Lee | ..................... | B25B 23/0014 |
| 10,625,403 B2 * | 4/2020 | Hsieh | ...................... | B25B 13/06 |
| 2014/0260825 A1 * | 9/2014 | Milligan | ............. | B25B 23/0035 81/124.6 |
| 2015/0135910 A1 * | 5/2015 | Eggert | .................. | B25B 13/065 81/121.1 |
| 2015/0217431 A1 * | 8/2015 | Seith | ....................... | B25B 21/02 81/121.1 |

(Continued)

*Primary Examiner* — David B. Thomas (57) ABSTRACT

A reaction washer is optimized for lock-on, optional stiction ring and for a predetermined indentation depth of bidirectional serrations for secure reaction torque transfer during initial and full actuation of respective nut or bolt heads resting on it. An optional lock-on ring embedded around the reaction socket is ergonomically actuated to latch on and off underneath the reaction washer. Axial offset of the peak stress areas away from the actuation socket edges provides for reduced actuation socket diameter and consequently for the entire tool and system remaining substantially within radial assembly limits established for prior art actuation sockets alone. A coupling unit is attached to and tightened on a power torque wrench via a clamp tool utilizing the power wrench's own torque. A hand hold groove and a lock able snap release button offset from the coupling castle snap connection contribute to safe and ergonomic operation and system peak performance.

5 Claims, 8 Drawing Sheets

(56) References Cited

U.S. PATENT DOCUMENTS

| | | | |
|---|---|---|---|
| 2015/0217433 A1* | 8/2015 | Seith | B25B 23/0035 81/124.6 |
| 2016/0193724 A1* | 7/2016 | Abel | B25B 13/065 81/125 |
| 2016/0375563 A1* | 12/2016 | Junkers | B25F 5/026 81/467 |
| 2017/0021478 A1* | 1/2017 | Junkers | B25B 13/488 |
| 2018/0021927 A1* | 1/2018 | Lin | B25B 13/06 81/121.1 |
| 2019/0003513 A1* | 1/2019 | Junkers | F16B 43/00 |
| 2019/0120275 A1* | 4/2019 | Junkers | F16B 23/003 |
| 2019/0178283 A1* | 6/2019 | Davis | F16B 23/0061 |
| 2020/0156220 A1* | 5/2020 | Chou | B25B 13/48 |
| 2020/0386263 A1* | 12/2020 | Davis | B25B 21/002 |
| 2021/0095710 A1* | 4/2021 | Junkers | B25B 23/0078 |

* cited by examiner

SLIPPAGE FREE COMPACT REACTION WASHER BASED ACTUATION AND REACTION TORQUE TRANSFER SYSTEM WITH LOCK-ON CAPABILITY

PRIORITY CLAIM

This present Patent Applications claims priority to and from U.S. Provisional Patent Application of the same Title and Inventor, filed on Nov. 11, 2018, Application No. 62/758,676.

FIELD OF INVENTION

The present invention relates to interchangeable systems and tools for locked-on power assisted tightening or loosening of a nut and/or bolt head while transferring the corresponding oppositely acting reaction torque concentrically and free of slippage onto a reaction washer beneath that nut and/or bolt head.

BACKGROUND OF INVENTION

The advantages of fast reaction washer based nut and bolt tightening and loosening free of distorting and torque degrading side loads become more commonly recognized. Consequently, reaction washers and the respective tools and systems are demanded in ever increasing numbers of varying sizes, applications, functionalities, and performance.

The reaction torque is oppositely directed and at the same level as the actuation torque via which nuts and/or bolt heads are actuated. It needs to be transferred onto a reaction washer that has to at least roughly comply with conventional washer height standards, which is only a fraction of the nut or bolt head height available for actuation torque transfer. At the same time, reaction washers and the tools or systems accessing them need to remain within lateral dimensional assembly limits that have been established for actuation sockets only and for conventional washers. Furthermore, lock-on functionality is increasingly asked for that on one hand enables the system to be locked on to the nut or bolt head. Therefore, there exists a need for a reaction washer based actuation and reaction torque transfer system that provides ergonomic and fast lock-on functionality while the reaction washer remains substantially similar to dimensional standards of conventional washers and that provides the respective tool system substantially within assembly spacing standards for actuation only sockets. The present invention addresses this need.

Reaction washers need to provide positive bite without any slippage from the very onset of the tightening process even through eventual paint, rust and contaminant layers. But at the same time, they should indent only a predetermined amount so as not to damage the base surface and eventual anticorrosion coatings. These somewhat contradicting requirements may require eventual employment of additional structural elements in between the reaction washer bottom and the base surface it is resting on. Therefore there exists a need for a reaction washer bottom configuration that provides a predetermined limited bite edge indentation depth, evacuation capability of paint, rust or debris and at the same time is capable to be combined with optional stiction structures. The present invention addresses also this need.

To loosen a tightened nut or bolt head, substantially more torque may be likely required than was applied during tightening. This is because lubricant commonly gets pressed out of the tread faces pressing against each other, or the lubricant hardens over time, or corrosion causes the threads to lock together. To the contrary of this requirement, prior art reaction washers do not provide any directionally oriented bite edges or provide bite edges with positive bite only in tightening direction. This may cause during initial loosening micro slippage of the reaction washer bottom on the base surface around the torque transfer axis as the indented serrations may slide out of their indentations. Such micro slippage and the resulting micro ramping motion of the bite serrations out of their indentation may substantially increase axial bolt load and may consequently additionally increase the loosening torque. Therefore, there exists the need for a reaction washer bottom configuration with bite serrations providing positive bite in both directions around the washer axis. The present invention addresses also this need.

In a prior art actuation and reaction torque transfer system of the present inventor, a coupling system between the reaction socket and a socket adapter includes snap actuators that extend in between coupling castles of the socket adapter. This reduces the number of castles available for torque transfer from the socket adapter onto the reaction socket and consequently causes peak stresses in the adjacent coupling castles and reduces overall peak performance of such prior art actuation and reaction torque transfer system. Therefore, there exists a need for a coupling system that is actuated in an offset to the coupling castles such that all of them are employed for reaction torque transfer. The present invention addresses also this need.

To facilitate fast exchange of actuation and reaction sockets it is desirable to have a coupling unit of a reaction washer based actuation and reaction torque transfer system affixed on the housing of the driving power torque wrench. At the same time, it is desirable for the coupling unit to provide ergonomic hand access for a balanced handling of the overall weight of the combined system and power torque wrench. Therefore, there exists a need for a coupling unit that provides ergonomic hand holding and is securely affixed onto a power torque wrench housing with minimal effort. The present invention addresses also this need.

Figure 6:
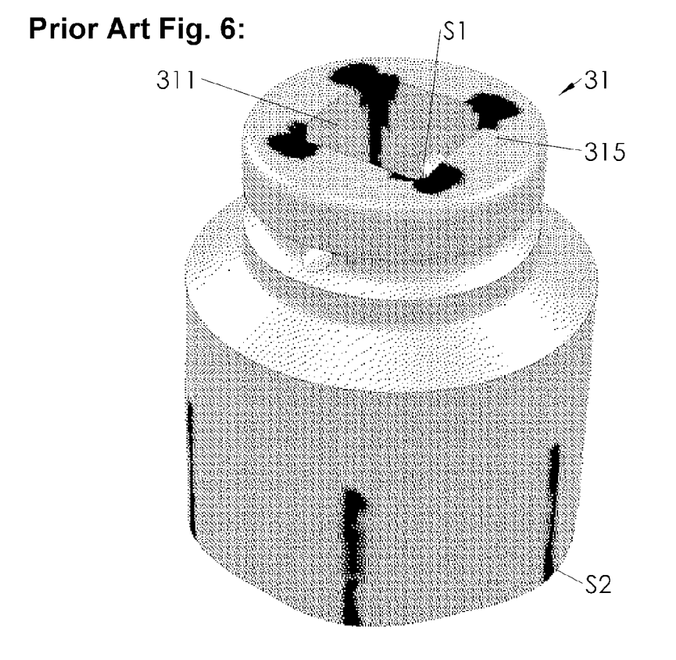
FIG. 6 is a dithered line shaded fourth perspective view of a prior art actuation socket stress simulation depicted with scaled deformation and revealing peak stress areas acting as rupture initiation sites at the socket edges.
Figure 7:
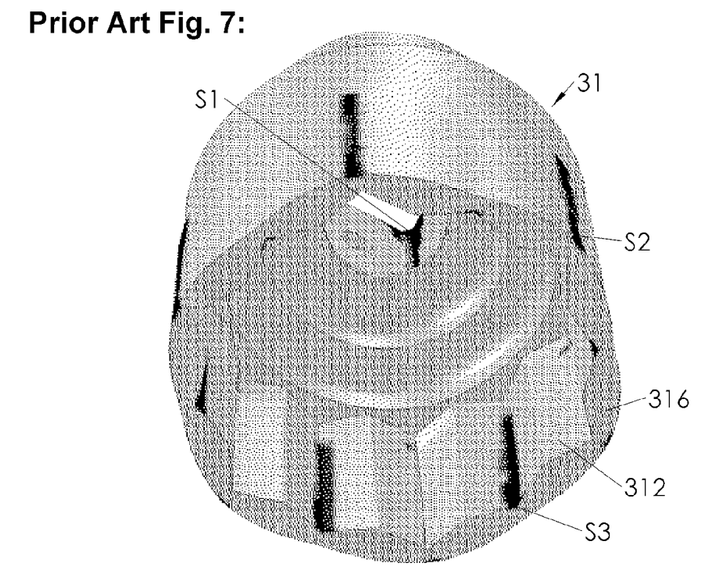
FIG. 7 is a dithered line shaded fifth perspective view of FIG. 6.

As shown in Prior Art FIGS. 6, 7 and during torque application by the power torque wrench onto the nut or bolt head via prior art actuation sockets 31, peak stress areas S1, S2, S3, are developing on the torque transfer cavities 311, 312 up to the outer top and bottom faces 315, 316 of prior art actuation sockets 31. Such peripheral peak stress areas S1, S2, S3 may act as rupture initiation sites that substantially reduce the overall structural capability of prior art actuation sockets 31. Consequently, prior art actuation sockets 31 have been designed with excessive wall thickness to counteract any peripheral rupture initiation. Such excessively dimensioned prior art actuation sockets 31 substantially impair the overall necessary compactness and applicability of reaction washer based reaction torque transfer system in which a reaction socket and eventually an additional lock-on structure may have to be assembled around the central actuation socket. Therefore, there exists the need for an actuation socket configuration that prevents peak stress areas from acting as rupture initiation sites. The present invention addresses also this need.

SUMMARY

Reaction washer torque receive structures along the reaction washer circumference are dimensioned and their torque receive faces being oriented under consideration of friction between them and the torque inducing structures of the reaction socket for increased torque transfer capability while at the same time providing a geometry that is improving reaction washer fabrication, and reaction socket peak performance. At the same time, additional spacing directly and inward underneath the torque receive structures provides for a lock-on functionality as well as an additional optional stiction ring to be assembled at the reaction washer bottom.

The reaction washer bottom is configured with bi directionally biting serrations with predetermined indentation depth and a continuous bottom contact surface for a direct load transfer onto the base surface. Radial evacuation grooves are placed to assist in clearing the contact interface from eventual paint and/or unwanted deposits, while at the same time may assist in the forming and manufacture of the reaction washer and the bite edges.

A lock-on ring may be additionally employed to axially lock the actuation and reaction torque transfer system together with the coupled power torque wrench onto the nut and/or bolt head via the reaction washer. The optional lock-on ring, reaction socket and actuation socket may be concentrically assembled in a socket unit and may remain substantially within radial dimensions of conventional prior art actuation sockets. This is contributed to by offsetting peak stress areas in the actuation socket axially away from its axial ends thereby eliminating their effects as rupture initiation sites.

Peak performance and ergonomic handling of the system and the coupled power torque wrench is further facilitated by providing firstly the snap release button in an axial offset to the snap coupling interface between the reaction socket and the coupling unit attached to the power torque wrench. That way, all coupling castles may be employed for torque transfer, while at the same time the snap release button may be ergonomically accessed and also secured against unintentional snap release. Secondly, the coupling unit provides a circumferential handling groove that provides for a safe and ergonomic hand holding of the combined actuation and reaction torque transfer system and power torque wrench. One hand of the operator may hold the combined assembly ergonomically at a most forward position on the coupling unit or the lock-on ring, while the second hand is holding and controlling the power torque wrench at its rear end. The overall weight of the combined system and power torque wrench is thereby transferred on both operator hands and arms in a most balanced fashion. Furthermore, having one operator hand at a most forward position provides for most accurate positioning and engaging of the system.

DETAILED DESCRIPTION

Referring to FIGS. 1, 1A, 1B, 1C, of the preferred embodiment of the invention, a reaction washer 10 based actuation and reaction torque transfer system 100 has a torque transfer axis 100A around which are substantially concentrically and simultaneously applied a well known actuation torque onto an actuation receiving structure 1 such as a nut 1 together with a thread stud 4 or a bolt head. A well known oppositely acting reaction torque is transferred onto a reaction washer 10 underneath the actuation receiving structure 1. In the following and the above, the term top is referring to a side facing towards the power torque wrench 90 along the torque transfer axis 100A and the term bottom is referring to a side facing away from the power torque wrench 90 along the torque transfer axis 100A.

A number of torque receive structures 25 are circumferentially arrayed around a base flange 35 of the reaction washer 10. The torque receive structures 25 may preferably each have torque receive faces 29 that are radially oriented with respect to the torque transfer axis 100A within a radial friction angle 29A of up to about thirtyone degrees, which corresponds to a well known friction coefficient range between metals. As a favorable result, the reaction torque received by each of the torque receive faces 29 is substantially free of radial slippage between them and their respective torque inducing structures 322 and consequently the reaction socket's 320 torque inducing structures 322 may be substantially free of radial outward bending forces. This may substantially contribute to a radially slim dimensioning and circumferentially interrupted configuration of the torque inducing structures 322 as may be well appreciated by anyone skilled in the art.

First sets of two torque receive faces 29 are in a receive face structure angle 29C circumferentially oppositely positioned to each other. Second sets of two torque receive faces 29 are in a receive face gap angle 29G circumferentially facing each other between circumferentially adjacent torque receive structures 25. Receive face structure angles 29C and receive face gap angles 29A may be each substantially equal around the base flange 35 for a circumferentially free oriented coupling with the torque inducing structures 322 of a reaction socket 320. The receive face structure angles 29C and the receive face gap angle 29G may differ by less than twenty five percent in general.

Preferably, the radial friction angle 29A of all torque receive faces 29 may be between four and ten degrees and the receive face structure angle 29C and receive face gap angle 29G may differ by less than including 15 percent. This preferred radial friction angle 29A range and the receive face angles 29G, 29C difference may provide the torque receive faces 29 of the first set in parallel orientation on each torque receive structure 25, which may assist in a radial inward material flow during fabrication forming of the reaction washer, while at the same time providing maximum shear resistance of the torque receive structures 25 at the most stress peak critical area in the immediate vicinity of the base flange diameter 35D as may be well appreciated by anyone skilled in the art. At the same time, the preferred radial friction angle 29A range and the preferred receive face angles 29G, 29C difference may provide the torque receive structures 25 in a feasible large number around the base flange diameter 35D, such that contact pressures and resulting peak stresses between torque inducing structures 322 and respective torque receive structures 25 are at a minimum while at the same time the torque inducing structures 322 and torque receive structures 25 remain sufficiently large in their circumferential extension for a most easy coupling between them as may be well appreciated by anyone skilled in the art. Consequently, the torque receive structures 25 have an outer diameter 25D that may be preferably less than fifteen percent larger than the receive base diameter 35D. In that way, the torque receive structures 25 may fit substantially within established radial spacing limitations established for conventional washers, while at the same time providing sufficient access and strength for reaction torque transfer up to actuation torque levels of highest grade actuation receiving structures 1 and their respective shaft and thread dimensions as is well known in the art.

The torque receive structures 25 may further feature bottom faces 25B in a bottom face angle 25BA of up to twenty degrees off perpendicular from the torque transfer axis 100A such that an outer receive structure thickness 25T is substantially less than a base thickness 35T. This may assist in providing increased lock-on clearance 337C to a lock-on lip 333 of a lock-on ring 330 to reliably latch on underneath the torque receive structures 25 and to couple onto the actuation receiving structure 1 the system 100 together with an attached power torque wrench 90 as is shown in FIGS. 2, 3, 4A, 4B. At the same time, the thickness and structural strength of the torque receive structures 25 is kept at a maximum at the base flange diameter 35D where the torque receive structures 25 extend from. At the same time, the lock-on lip 333 may remain in sufficient lip bottom clearance 333C to the base surface 7 to avoid interference with eventual deposits, paint and/or debris on the base surface 7.

Moreover, the torque receive structure bottoms 25B and a base flange bottom 40 may preferably form a common conical bottom with a common bottom cone angle of generally up to thirty and preferably less than twenty degrees, which may again facilitate radial inward material flow during fabrication forming of the reaction washer 10. At the same time, the continuous transition from the circumferentially intermittent torque structure bottoms 25B onto the circumferentially continuous base flange bottom 40 may substantially reduce peak stress areas in the bottom corners between torque transfer faces 29 and the base flange diameter 35D as may be well appreciated by anyone skilled in the art.

At least one but preferably both of torque receive structures 25 and the base flange 35 may further provide coupling centering features 25R, 35R that are selected from one of a radius and a chamfer. The outer centering feature 25R may be between the outer receive structure diameter 25D and a receive structure top 26. The base centering feature 35R may be between the base diameter 35D and a base flange top 39. The coupling centering features 25R, 35R may assist in reducing gap dimensions between torque inducing structures 322 and torque receive structures 25 while at the same time provide for fast and easy engaging and coupling between the two of them. Furthermore and as may be well appreciated by anyone skilled in the art, the coupling centering features 25R, 35R may be conveniently formed during stamping out the overall outside contour of the reaction washer 10 defined by the contours of the torque receive structures 25 and the base flange diameter 35D.

A number of torque inducing structures 322 are extending at a bottom end of the reaction socket 320 from a bottom flange 327. Preferably all of the torque inducing structures 322 feature central torque inducing faces 325 and peripheral enforcement tapers 324. The central torque inducing faces 325 are oriented such that they are substantially mating the respective opposite torque receive faces 29 while the reaction torque is transferred from the central torque inducing faces 325 onto the torque receiving faces 29. The peripheral enforcement tapers 324 taper radially outward and circumferentially away from their adjacent torque inducing faces 325. Thereby they are structurally enforcing the torque inducing structures 322 and are substantially contributing in keeping the circumferential extension of opposite torque inducing faces 325 of individual torque inducing structures 322 to a minimum and in corresponding to the preferred receive face gap angle 29G as may be clear to anyone skilled in the art. At the same time and as another favorable result, at a maximum of up to more than sixty degrees may be the lock-on clearance angle 331 of lock-on ring 330 bridging crowns 332 that may be snug encompassing the torque inducing structures 322 around the torque transfer axis 100A. Bringing the lock-on clearance angle 331 to a maximum may further contribute to accessibility of the reaction washer 10 in tight assembly locations on the base surface 7 as may be well appreciated by anyone skilled in the art.

The reaction washer 10 may feature a peripheral initial indentation diameter 21D around the torque transfer axis 100A. The reaction washer 10 may be initially indenting via biting features 27E along that initial indentation diameter 21D into a base surface 7 of a base flange 6 at the begin of a tightening process as is well known from prior art reaction washers of the present inventor. A novel centering shoulder 37 may be extending upwards substantially perpendicular from the outward vicinity of and with respect to the peripheral initial indentation diameter 21D up to the base flange bottom 40. That way, a clearance undercut 36 is defined with an undercut width 36W and an undercut height 36H within the base flange diameter 35D and underneath the base flange 35 in between it and the base surface 7 on which the reaction washer 10 may be operationally resting on. The clearance undercut 36 may firstly provide a maximum clearance volume around a reaction washer bottom face 17 and the bottom serrations 20 providing the bite edges 27 such that any paint or deposits that may be squished out of in between them and the base surface 7 during tightening may not clog the interface between torque receive structures 25, torque inducing structures 322 and eventual lock-on ring 330. Secondly, the system 100 may further include a stiction ring 50 that may be assembled on to and encompassing the centering shoulder 37 and that may be holding on to at least one of the centering shoulder 37 and the base flange bottom 40. The stiction ring 50 is preferably of a height 50H larger than the undercut height 36H such that in assembled position the stiction ring 50 may extend downward beyond the peripheral indentation diameter 21D in direction of a base surface 7 by a vertical stiction offset 51H. In that way, the stiction ring 50 may be in sticking contact with the base surface 7 while the reaction washer 10 is initially placed with its washer bottom 17, 27 on the base surface 7. As a favorable result and during initial tightening, the stiction ring may be deformed between the base surface 7 and the flange bottom 40 resulting in a forced sticking contact of the reaction washer 10 with the base surface 7 and an initial reaction torque transfer capability across the stiction ring 50 independently of any eventual initial bite edge indentation into the base surface 7.

The stiction ring 50 may be also of a width 50W that may be larger than a an undercut width 36W by a horizontal stiction offset 51W such that the stiction ring 50 may be extending radially outward beyond the base diameter 35D. Consequently, the stiction ring 50 may come into sticking contact with the torque inducing structures 322 of the reaction socket 320 and facilitate coupling of the system 100 to the reaction washer 10 as soon as the reaction socket 320 is operationally coupled with the reaction washer 10. The stiction ring 50 may be of a well known rubber or polyurethane material and/or any well known elastic sticking material. The stiction ring 50 may also be coated with an adhesive. Further more, the stiction ring 50 may be covered with a protective sheet that may be removed immediately prior to assembling the reaction washer 10. The stiction ring 50 may further have a circular cross section, in case of which stiction height 50H and stiction width 50W are equal.

The reaction washer 10 has a central through hole 11 that may be substantially concentric with respect to the torque transfer axis 100A and that extends in between a washer bottom side 12 and a washer top side 13. A number of bite edges 27 are arrayed around the torque transfer axis 100A on the washer bottom side 13 within a peripheral bottom circumference 17D, which may be larger or equal the initial indentation circumference 21D. A bearing bottom face 17 is in an indentation offset 27H along the bite edges 27 and is extending circumferentially in between the bite edges 27, and radially in between at least close to the radial outward ends and radial inward ends of the bite edges 27. As a favorable result, and while the reaction washer 10 is transferring an operational load onto the base surface 7, the bearing bottom face 17 is on one hand transferring a substantial first portion of the well known operational axial load between the central through hole 11 and the peripheral bottom circumference 17D, while on the other hand the bite edges 27 are indenting no more than up to the indentation offset 27D into the base surface 7 and are transferring a substantial second portion of the operational axial load. The bearing bottom face 17 may further feature a central bearing ring 18 that is circumferentially continuous in the immediate radial vicinity of the central through hole 11 such that indentation marks in the base surface 7 may not extend into a central hole of the base surface 7. The radially substantially continuous bearing bottom face 17 circumferentially interposed between the bite edges 27 in a predetermined indentation offset 27H warrants a maximum indentation depth into the base surface 7 irrespective induced maximum loads and hardness difference of the flange base 6 and the reaction washer 10.

A number of substantially radial evacuation grooves 28 may be circumferentially arrayed around the torque transfer axis 100A and may be circumferentially interposed in between alternately oppositely oriented bite edges 27. Such bi directionally acting bite edge pairs 27 in conjunction with respective evacuation grooves 28 in between them may conveniently indent underneath eventual paint layers on top of the base surface 7. As the paint below bearing bottom face 17 is squished out, the paint underneath the evacuation grooves 28 may extend into them and the bite edges 27 may indent and cut directly into the base surface 7 material underneath during washer loading and reaction torque induction. The bidirectional orientation of the bite edges 27 provides positive bite action in both directions around the torque transfer axis 100A during tightening and loosening. The evacuation grooves 28 may extend up to the peripheral bottom circumference 17D and may be open to the surrounding centering shoulder 37, such that excess deposits from the base surface 7 may be radially evacuated outward beyond the peripheral bottom circumference 17D. The substantially radial orientation of the evacuation grooves 28 may also assist for a radial inward material flow during fabrication forming of the reaction washer 10 and for forming the bite edges 17 along their circumferences as may be well appreciated by anyone skilled in the art.

At least three of the bite edges 27 may be circumferentially substantially evenly arrayed and configured with an orientation and an angle that is off perpendicular with respect to the torque transfer axis 100A such that only their respective peripheral bite edge ends 27E are at an initial bite depth 10H below an initial load receive top face 14 of the reaction washer 10. That way, only the at least three peripheral bit edge ends 27E are indenting into the base surface 7 during initial tightening of the actuation receive structure 1 on top of the reaction washer 10. Forming only a minimal number of bite edge ends 27E may increase positive bite and indentation into the base surface 7 from the onset of the tightening process and may substantially contribute in eliminating the risk of initial reaction washer 10 slippage. Furthermore, initial bite action may be thereby modulated independently of an eventual overall belleville configuration of the reaction washer 10 as taught in a prior art reaction washer of the present inventor. This in turn provides for an optimization of belleville configuration for overall safety performance independent of initial biting requirements of the reaction washer 10 as may be well appreciated by anyone skilled in the art.

The central through hole 11 may feature a centering shaft 11H and a top edge clearance 11R selected from a chamfer and a radius that are bigger than a well known bolt head transition radius 4R of an actuation receive structure 1 in the eventual form of a bolt that is resting on top 13 of the reaction washer 10. The centering shaft 11H may have a height that is at least equal to a well known thread pitch 4P of the bolt. Bolt head transition radius 4R and bolt thread pitch 4P are indicated in dotted lines in Fig. DD. In that way, the center hole diameter 11O may be selected with an oversize in relation to the matching thread or bolt diameter that is substantially less than in prior art reaction washers. This in turn is a prerequisite for a tight fit between the torque receive and torque inducing structures 25, 322 and consequently an improved reaction torque transfer capability as is clear to anyone skilled in the art.

Figure 1:
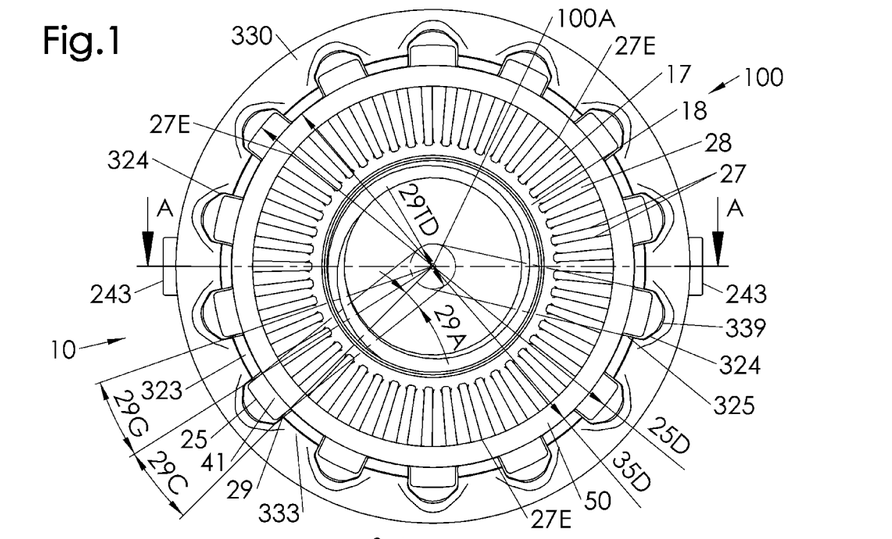
FIG. 1 is a bottom up view of a reaction washer within a reaction socket and lock-on ring of a preferred embodiment of the present invention.
Figure 1A:
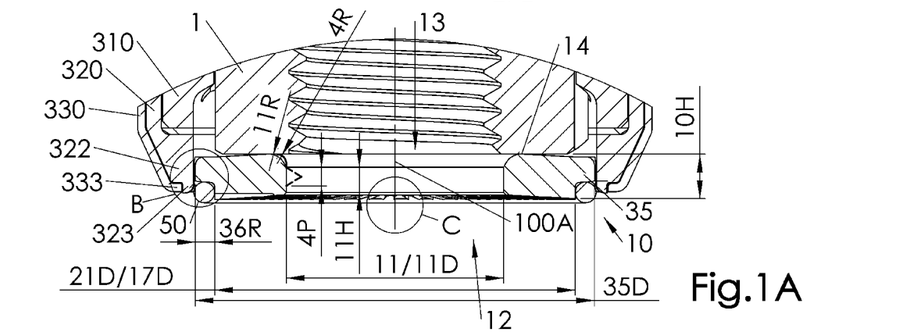
FIG. 1A is a bottom portion frontal cut view of FIG. 1 as indicated in FIG. 1.
Figures 1B, 1C:
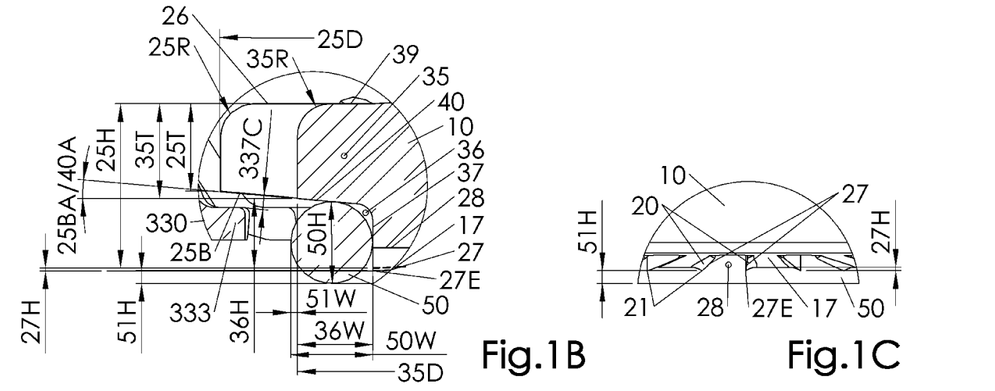
FIG. 1B is a first detail view of and as indicated in FIG. 1A with the reaction socket omitted for clarity.
FIG. 1C is a second detail view of and as indicated in FIG. 1A.
Figure 3:
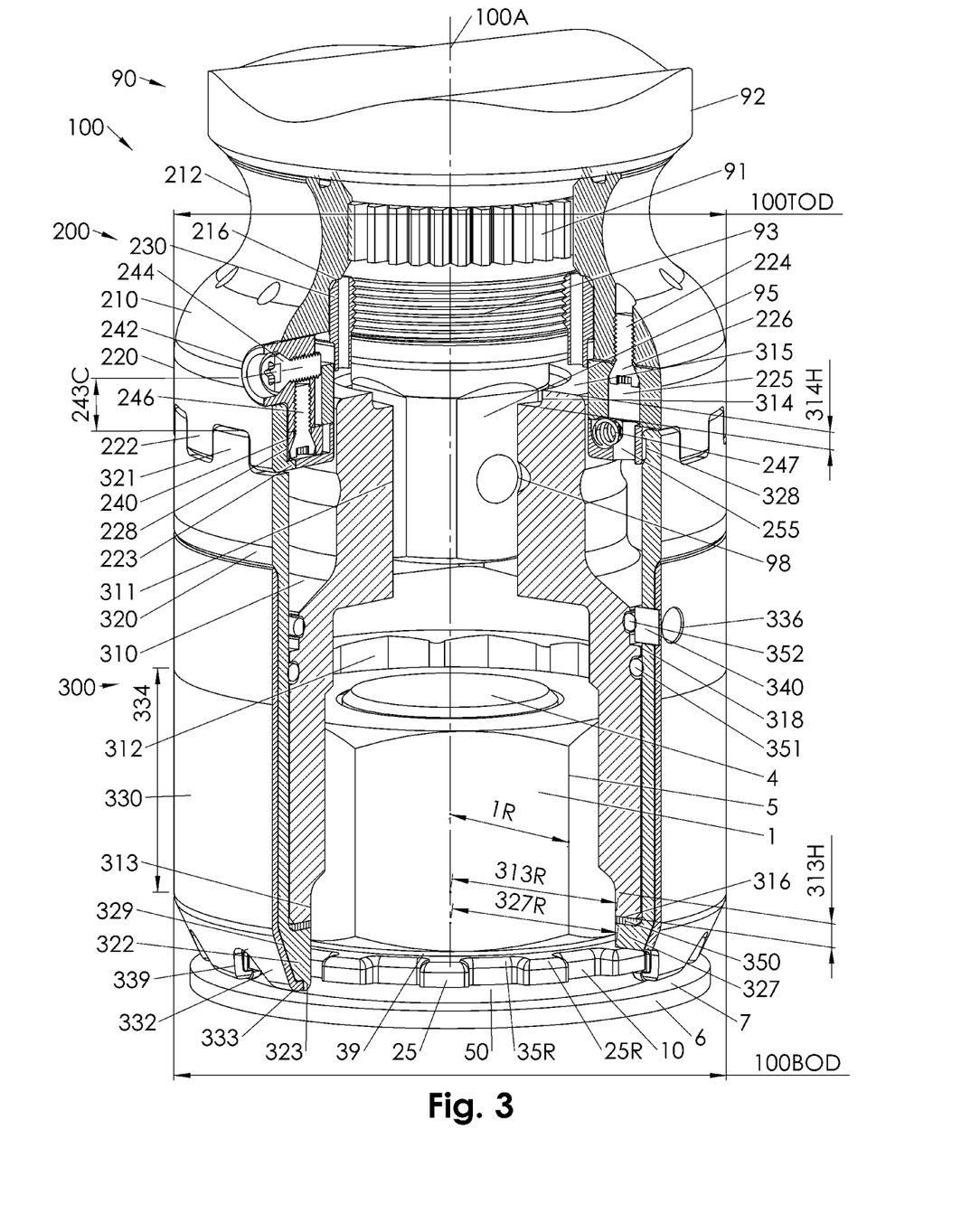
FIG. 3 is a second perspective cut view of the assembled embodiment of FIG. 2 in operational position coupled on its upper end to the power torque wrench of FIG. 2, and coupled on its bottom end to a prior art nut, and resting on a base surface.
Figure 4A:
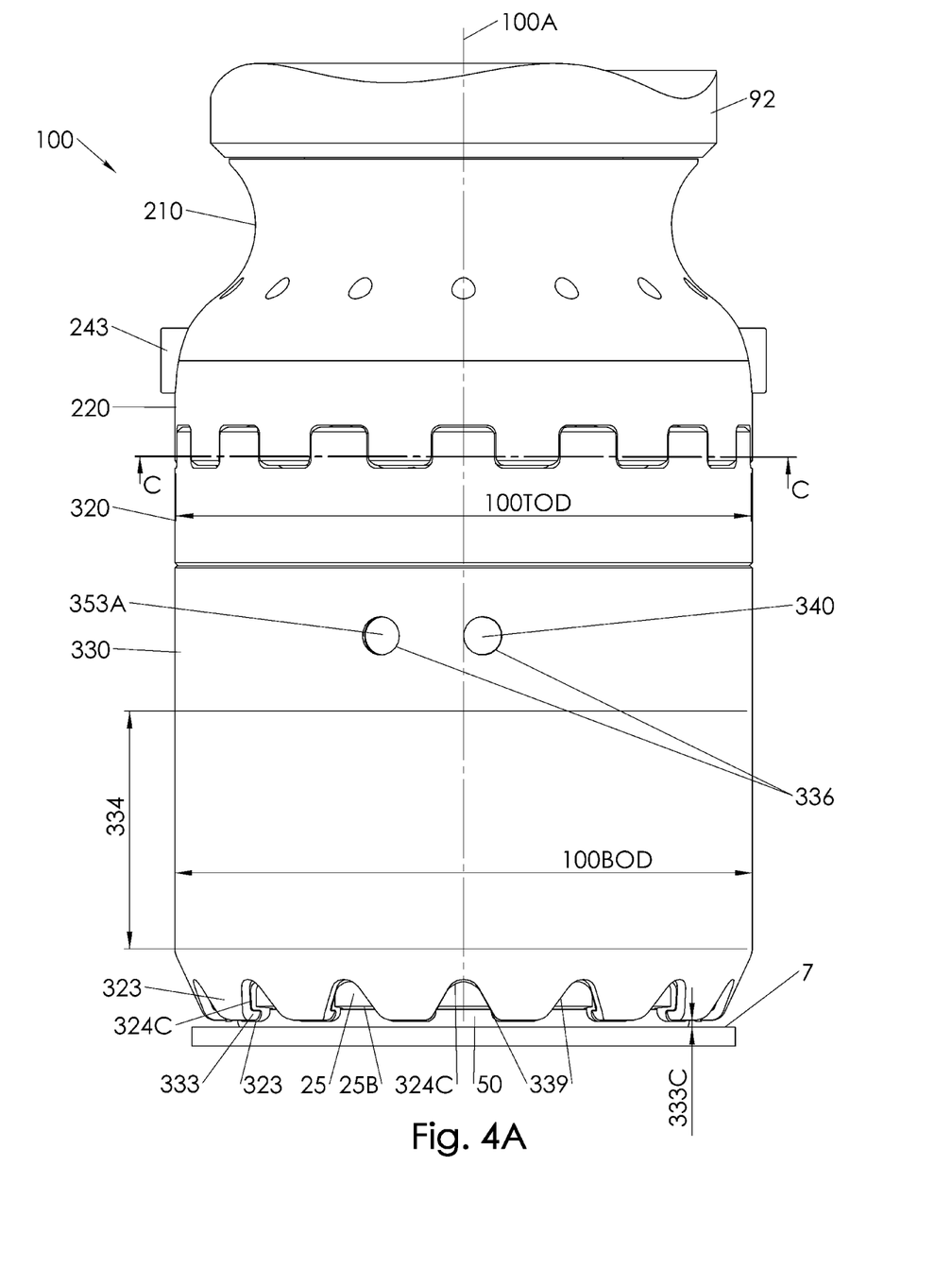
FIG. 4A is a front view of the assembled embodiment of FIG. 2 in operational position as in FIG. 3, with a lock-on ring in release orientation.
Figure 4B:
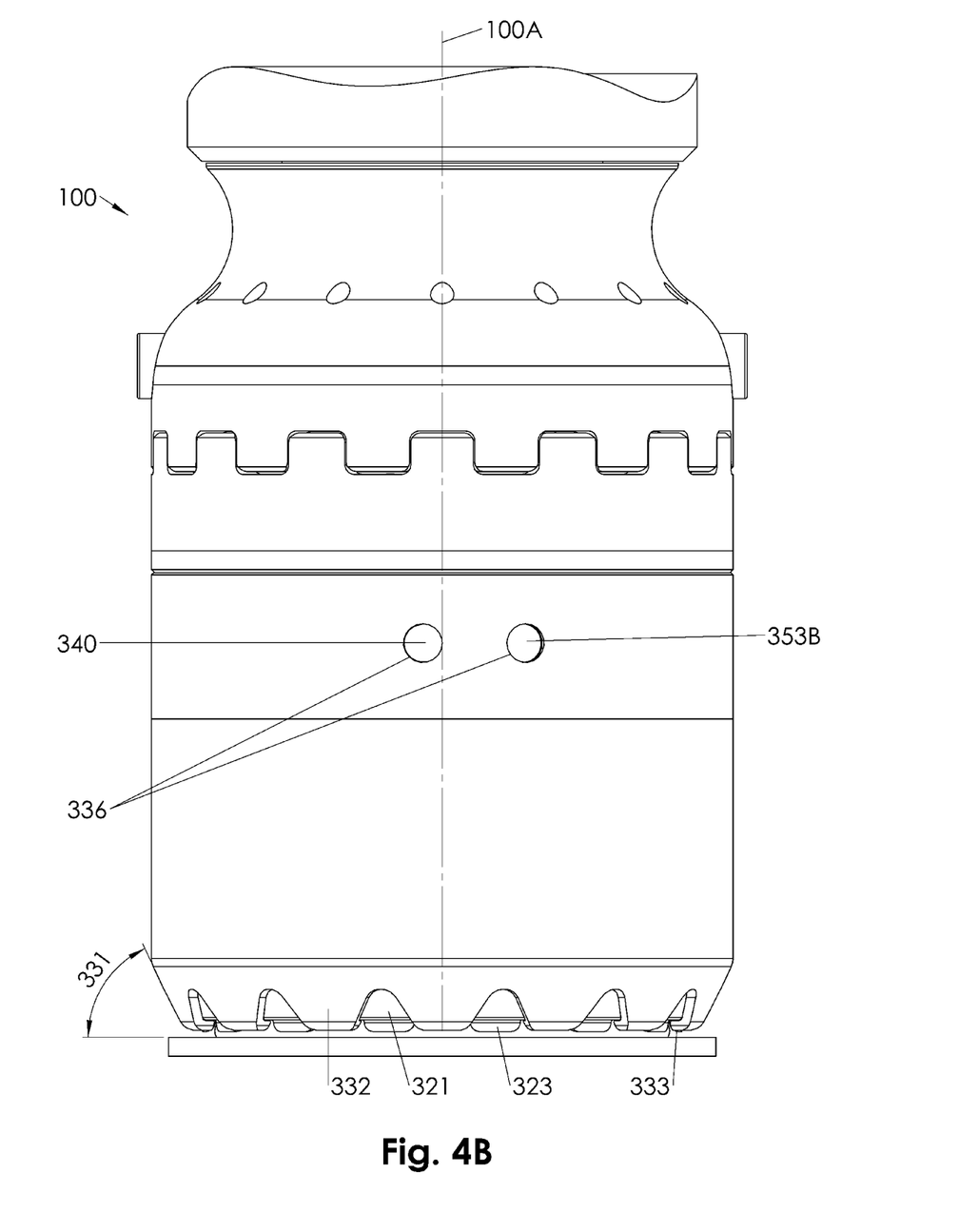
FIG. 4B is the front view of FIG. 4A with the lock-on ring in lock-on orientation.

Further referring also to FIGS. 4A, 4B, a lock-on ring 330 is rotationally free encompassing and axially coupled with the reaction socket 320, which in turn is rotationally free encompassing the central actuation socket 310. The lock-on ring 330 has a number of lock-on lips 333 that are oriented around the torque transfer axis 100A such that each of them is radially aligned with a respective one of the torque inducing structures 322 in a release orientation of the lock-on ring 330 with respect to the reaction socket 320 as depicted in FIG. 1, 3, 4A. While the lock-on ring 330 is in release orientation, the reaction socket 320 and lock-on ring 330 may be moved on and off the torque receive structures 25 and the system 100 axially coupled with and decoupled from the reaction washer 10.

In a lock-on orientation of the lock-on ring 330 with respect to the reaction socket 320 as depicted in FIG. 4B, the lock-on lips 333 are bridging the circumferential gaps between two adjacent torque inducing structures 322. Consequently and while the reaction socket 320 is axially coupled with the reaction washer 10, the lock-on lips 333 extend and lock on underneath the torque receive structures 25B. Since the lock-on ring 330 is axially coupled with the reaction socket 320, which in turn may be coupled with the coupling unit 200 and the actuation socket 310, the entire system 100 is locked-on to the reaction washer 10.

Figure 2:
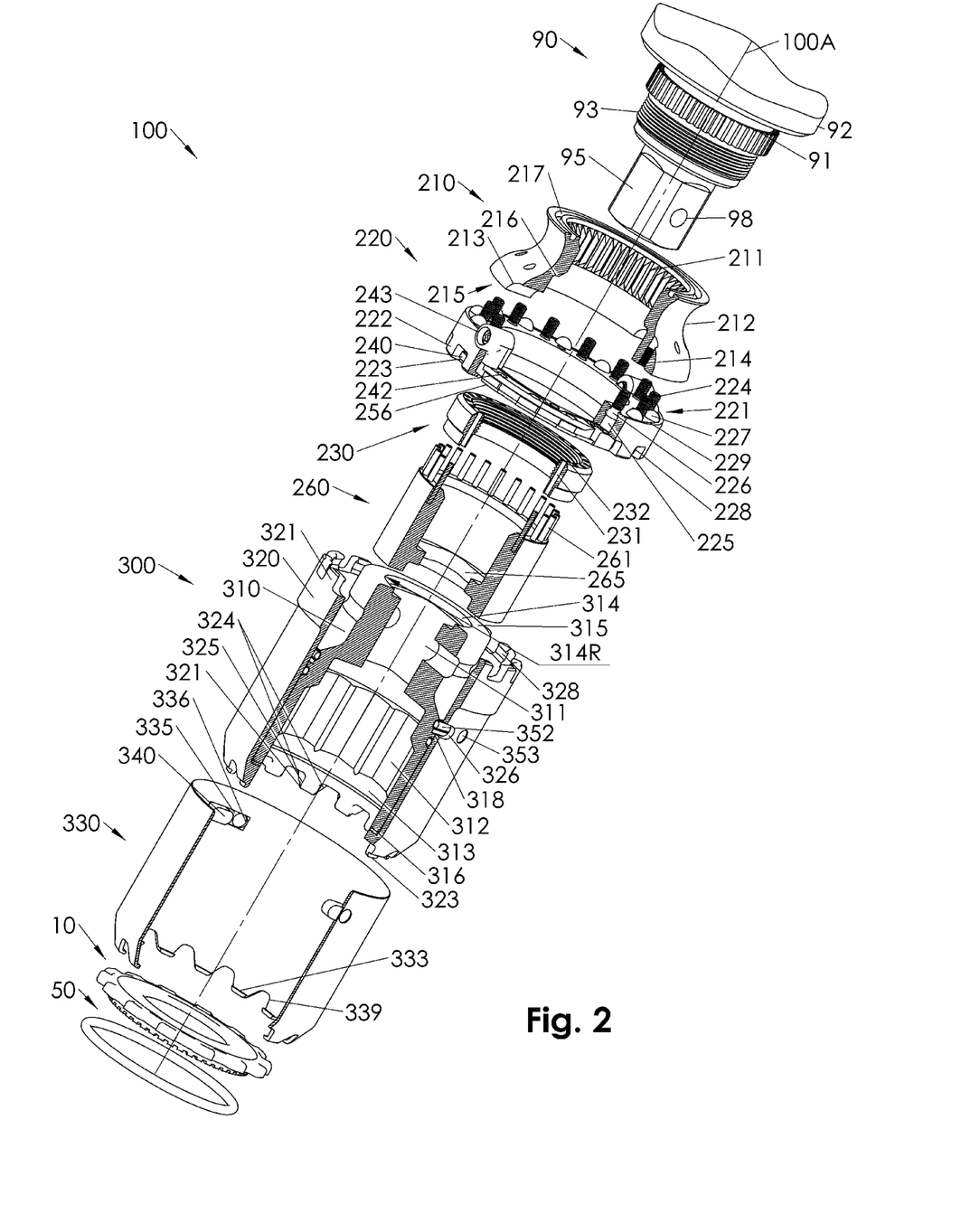
FIG. 2 is a first perspective cut view of an axially partially exploded preferred embodiment of the present invention and a portion of a prior art power torque wrench.

Further referring to FIGS. 2, 3, the torque inducing structures 322 may preferably have a common outer cone face 329 that tapers inward in downward direction away from a bottom flange 327 of the reaction socket 320. This provides maximum structural strength of the torque inducing structures 322 at their transition to the bottom flange 327 while at the same time keeping the radial outward extension at the very bottom of them to a minimum. The contour edge 324C between the peripheral enforcement tapers 324 and the outer cone face 329 may be a taper silhouette 324C. The lock-on lips 333 are extending from a bridging crown 332 that is combining the lock-on lips 333 with the main body of the lock-on ring 330. The bridging crown 332 may be snug encompassing the outer cone face 329 to mutually support each other and to keep the overall radial outside dimensions of the system 100 in the vicinity of the reaction washer 10 to a minimum. The bridging crown 332 may have an open crown contour 339 that may be substantially a radially outward projection of the outer taper silhouette 324C while the lock-on ring 330 is in release orientation. The open crown contour 339 provides a resilient support for the lock-on lips 333 such that in case of inadvertent mishandling of the lock-on ring 330 or peripheral impact, the lock-on lips 333 may resiliently deflect and not bend or break as may be well appreciated by anyone skilled in the art. Matching the open crown contour 339 with outer taper silhouette 324C in release orientation also warrants that during initial coupling of the system 100 with the torque receive structures 25, eventually rough impact with them during initial alignment is absorbed only be the structurally strong torque inducing structures 322. From the bottom of the torque inducing structures 322 may further extend lip protection rims 323 in an inside offset to and downward beyond the lock-on lips 333. While the lock-on ring 330 is in release orientation during system 100 coupling and decoupling from the reaction washer 10, the lip protection rims 323 may protect the lock-on lips 333 against impact with and damage from the torque receive structures 25.

Inside the lock-on ring 330 may be at least one but preferably two or more internal groove arcs 335 that are extending around said torque transfer axis 100A. In radial stone holes 326 of the reaction socket 320 may be inserted and radially guided sliding stones 340 that are also circumferentially sliding in their respective internal groove arcs 335. The internal groove arcs 335 may have a circumferential orientation and extension such that the sliding stones 340 are limiting the rotation of the lock-on ring 330 with respect to the reaction socket 320 between the release orientation and the lock-on orientation. At the same time, the sliding stones 340 are axially coupling the lock-on ring 330 with the reaction socket 320.

The internal groove arcs 335 may feature preferably at both their circumferential ends stop through holes 336, which may provide a positive stopping contact with the lateral sides of the sliding stones 340. The stop through holes 336 may be conveniently drilled thereby adding the radially oriented stopping contact into an otherwise gradually decreasing groove as is obtainable only with well known internal slot machining. The reaction socket 320 in turn may feature orientation markers 353, 353A, 353B that may be positioned with respect to the stop through holes 336 such that release indicating orientation markers 353A may be radially aligned and peripherally visible through the respective stop through holes 336 during release orientation and such that lock-on indicating orientation markers 353B may be radially aligned and peripherally visible through the respective stop through holes 336 lock-on orientation. Orientation markers 353A, 353B may be distinctively color coded for a convenient visual lock-on or release verification.

The radial stone holes 326 may be through holes through which the respective sliding stones 340 may be extending through and sliding along a retention shoulder 318 on the actuation socket 310 such that it may be axially held inside the reaction socket 320 by the sliding stones 340. A flexible stone push ring 352 such as a well known O-ring on the actuation socket 310 adjacent the retention shoulder 318 may springy push the sliding stones 340 outward against the internal groove arc and hold them radially in place. During assembly of the actuation socket 310 inside the reaction socket 320, the sliding stones 340 may be left out. Prior to assembling the lock-on ring 330, the sliding stones 340 may be radially pushed in against the push ring 352 and the lock-on ring 330 axially slid over the reaction socket 320 until the sliding stones 340 springy snap into the internal groove arcs 335. To disassemble the lock-on ring 330 and sockets 310, 320 from each other, the sliding stones 340 may be externally depressed at least partially through stop through holes 336 during release or lock-on orientation. The lock-on ring 330 may then be rotated further around the reaction socket 320 so that the sliding stones 340 are freed out of the internal groove arcs 335. The lock-on ring 330 may then be axially removed again, followed by radially removing the sliding stones 340, which in turn releases again the actuation socket 310 from the reaction socket 320.

An axial bottom socket bushing 350 may be positioned between the bottom flange 327 and the bottom end of the central actuation socket 310. An upper radial seal ring 351 may be positioned radially in between the central actuation socket 310 and the reaction socket 320 axially distant to the bottom flange 327. In case of a retention shoulder 318, the upper radial seal ring 351 may be immediately below the retention shoulder 318. The axial bottom socket bushing 350 and the upper radial seal ring 351 may have well known low friction, resiliency and sealing properties to retain a lubricant between them and the sockets 310, 320 particularly in the region of eventual radial stress expansion on the thin walled bottom portion of the actuation socket 310. At the same time, a resilient concentric and axial low friction positioning of the two sockets 310, 320 with respect to each other is provided. Consequently and in combination with the retention shoulder 318 and the sliding stones 340 engaging on it, the sockets 310, 320 and the lock-on ring 330 may be combined in a socket unit 300 that may be conveniently coupled in varying sizes with the coupling unit 200. The lock-on ring 330 may feature grip serrations 334 on its outer circumference to provide slip resistant manual handling of the socket unit 300 and rotation of the lock-on ring 330 between release orientation and lock-on rotation. Furthermore and due to the slippage free biting of the reaction washer 10 into the base surface 7 from the onset of the power torque wrench 90 assisted tightening and loosening, the lock-on ring 330 as well as the reaction socket 320 may remain rotation free during tightening and loosening. Thus, the entire system 100 including the attached power torque wrench 90 may be conveniently held with one hand also at the grip serrations 334 while the second operator hand is controlling the power torque wrench 90 as is well known in the art. That way, the overall weight of the combined system 100 and power torque wrench 90 is balanced in a most ergonomic fashion between the two operator hands.

The coupling unit 200 is receiving the reaction torque via a spline flange 91 that is part of a well known power torque wrench's 90 housing 92. From the coupling unit 200, the reaction torque is transferred onto the reaction socket 320 across a coupling interface including on the coupling unit 200 a number of socket coupling castles 222 that are circumferentially arrayed on a distal axial bottom end of the coupling unit 200, preferably two snap arcs 240 and preferably two release buttons 243. The coupling interface further includes on the reaction socket 320 a number of circumferentially arrayed interface coupling castles 321 on a distal axial top end of the reaction socket 320. Preferably all socket coupling castles 222 have a snap arc retention lip 223 at their inner bottom ends thereby forming arc guiding grooves 228 via which the snap arcs 240 are radially slide able guided onto the coupling unit 200. Preferably all interface coupling castles 321 in turn feature snap grooves 328 via which the reaction socket 320 is held onto the snap arcs 240 while the snap arcs 240 are held in their most radial outward position with respect to the torque transfer axis 100A where they may snug engage in the snap grooves 328 while the socket coupling castles 222 and the interface coupling castles 321 are circumferentially uninterrupted interlocking with each other during the coupling unit's 200 axially coupling with the reaction socket 320.

The uninterrupted interlocking of all socket coupling castles 222 with all interface coupling castles 321 is a prerequisite for a balanced torque transfer across all castles 222, 321 thereby avoiding isolated peak stress areas in individual castles 222, 321 that may compromise and reduce the overall reaction torque transfer capacity across the coupling interface 222, 321, 240, 243. The uninterrupted interlocking of all castles 222, 321 is facilitated by the release buttons 243 being connected to their respective snap arcs 240 and being radially extending outward beyond the coupling unit 200 in a release access clearance 243C to the socket coupling castles 222.

Preferably both release buttons 243 feature each a snap lock screw 244 that may be peripherally actuated to selectively lock the respective snap arcs 240 via their release buttons 243 in a snap-in position. Thus, inadvertent decoupling of the socket unit 300 from the coupling unit 200 may be avoided. The snap lock screws 244 may be screwed in and extend radially through their release buttons 243 in actuation direction of them. To lock the release buttons 243 and their snap arc 240, the snap lock screws 244 may be screwed in until they push with their inside end against the coupling body 220. Vice versa, if the snap lock screws 244 are screwed out, their release buttons 243 and connected snap arcs 240 may be unimpeded actuated and the socket unit 300 coupled and decoupled from the coupling unit 200.

The release buttons 243 may be axially extending through the coupling body 220 and be attached via respective button connect screws 246 to their snap arcs 240. The snap arcs 240 may be springy pushed radially outward via snap arc springs 247 acting in between the snap arcs 240. The release buttons 243 are also radially extending in an adapter interface between the coupling body 220 and an adapter flange 210 of the coupling unit 200 and may be radially guided in bottom channels 213 of the adapter flange 210.

The adapter flange 210 has an internal adapter spline 211 for coupling with the external spline 91 of the power torque wrench 90. At the adapter 210 top face may be a seal groove 217 that may receive a well known O-ring for sealing the coupling unit's 200 spline connection. Further part of the adapter interface may be a number of adapter flange screws 224 and shear balls 227 that are circumferentially arrayed in between the bottom channels 213 around the torque transfer axis 100A between and embedded in an adapter flange 210 bottom face 215 and a coupling body 220 top face 221. The shear balls 227 may be of a hardened material such as bearing balls. The adapter flange screws 224 are preferably positioned in between the shear balls 227 such that upon tightening of the adapter flange screws 224, the shear balls 227 are sandwiched in between the coupling body 220 and the adapter flange 210. The corresponding spherical blind holes in the coupling body top face 221 and the adapter bottom face 215 may be conveniently and precisely drilled by well known ball mills and adjusted for a predetermined unidirectional press fit with the shear balls 227. The shear balls 227 consequently transfer the reaction torque from the adapter flange 210 onto the coupling body 220, while at the same time providing accurate axial and radial positioning between them within a minimal adapter interface ring area as may be well appreciated by anyone skilled in the art. A contact rim 229 along the outer circumference of at least one of the bottom face 215 and the top face 221 may be optionally additionally employed to provide contact sealing between the faces 215, 221.

Shear balls 227 and adapter flange screws 224 may be positioned on the top face 221, such that preferably all the adapter flange screws' 224 heads 226 are accessible across respective screw head channels 225 in between the socket coupling castles 222. The coupling body 220 and the adapter flange 210 may be that way conveniently screwed together via the bottom side of the coupling unit 200 without compromising the structural strength of the socket coupling castles 222. Moreover, the snap arcs 240 and a snap arcs cover 256 may feature screw access holes 242, 255 that may be of a diameter to provide tool access only to the adapter flange screw heads 226. The shear balls 227 may be preferably press fitted into the coupling body 220 providing centering and positioning to an adapter flange 210 onto the coupling body 220 immediately prior to them being screwed together. The adapter flange screws 224 that may be conveniently trapped and loosely guided inside the assembled coupling body 220 merely need to be pushed into the thread holes 214 and tightened. The adapter flange 210 may further feature a hand groove 212 circumferentially recessed outside the adapter flange 210 and around the torque transfer axis for ergonomically holding and axially pushing the system 100 with the attached power torque wrench 90.

Figure 4C:
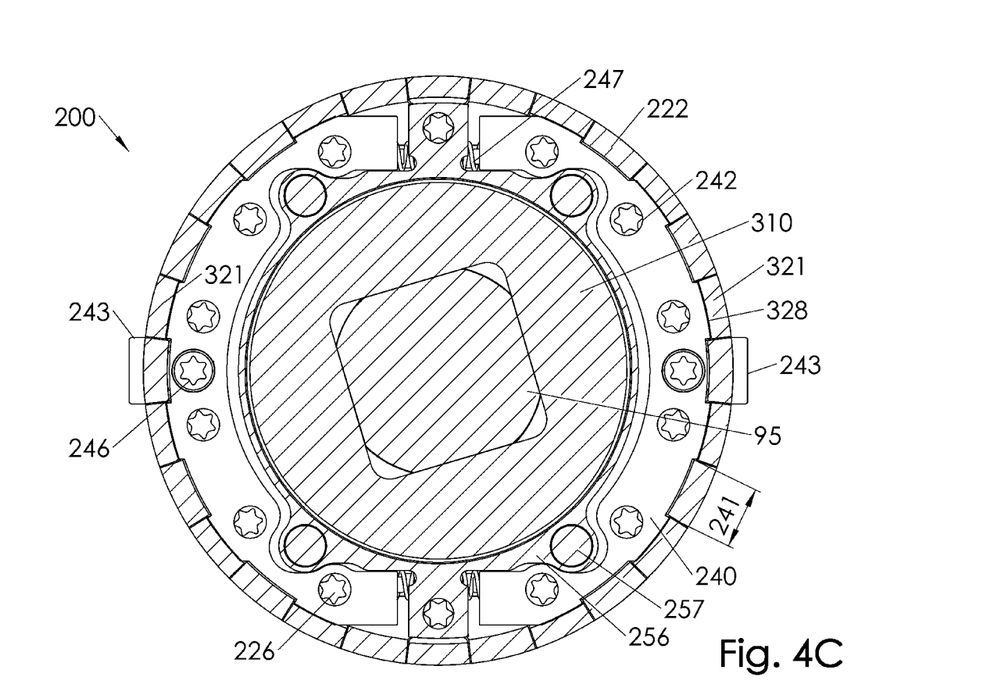
FIG. 4C is a top down cut view of a coupling unit of the preferred embodiment of the invention as indicated in FIG. 4A.
Figure 5:
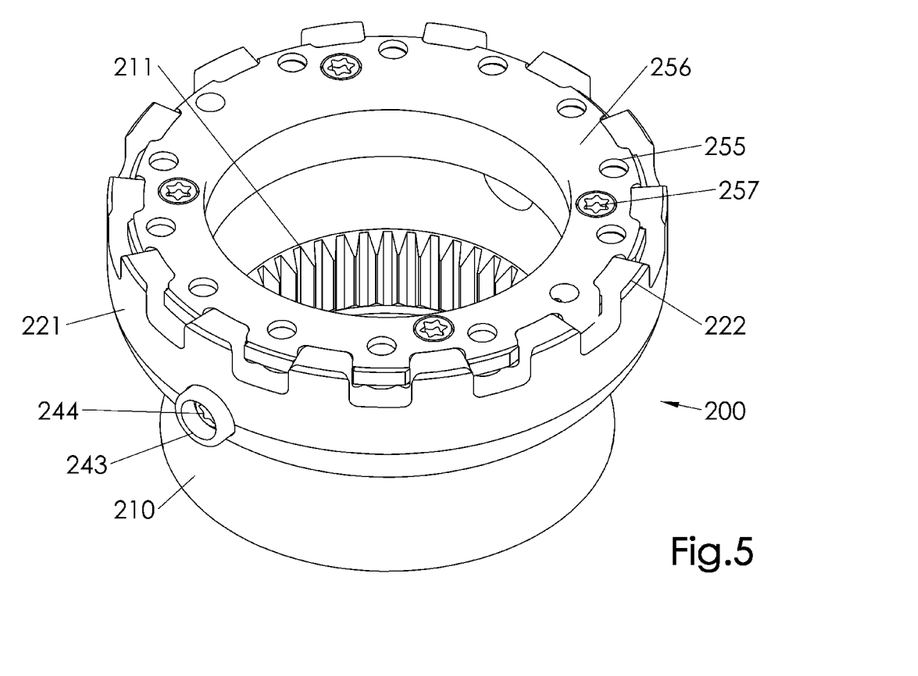
FIG. 5 is a third perspective view of the assembled coupling unit of FIG. 4C.

Referring also to FIGS. 4C, 5, the snap arcs cover 256 may be tied down via a number of cover screws 257 around which the snap arcs 240 are radially cleared. The snap arcs 240 may further feature arc clearance arc recesses 241 that are radially inward recessed from the snap arcs outer arcuate circumferences to selectively snug fit in the reaction socket's 320 snap grooves 328 only. This may assist in securing an unimpeded snap connection between snap arcs 240 and interface coupling castles 321 only.

Preferably the adapter flange 210 may feature the adapter spline 211 and an axial lock shoulder 216. The adapter spline 211 is configured for circumferentially and radially coupling the coupling unit 200 to the external spline flange 91. A clamp ring 230 may be employed for pushing against the axial lock shoulder 216 while being screwed with its clamp thread 232 onto an attachment thread 93 on the torque wrench housing 92. The clamp ring 230 may have a torque receptacle 231 such as a number of circumferentially arrayed and axially extending tool pin holes 231. A clamp ring tool 260 may have a torque inducer 261 such as a number of axially extending coupling pins 261 that are circumferentially arrayed to mate with the tool pin holes 231. The clamp ring tool 260 may further have a drive shaft adapter 265 that is mating a well known drive shaft 95 of the power torque wrench 90. While the coupling pins 261 are inserted in and coupled with the pin holes 231 and the drive shaft adapter 265 is coupled with the drive shaft 95, the clamp ring 230 may be actuated by the power torque wrench 90 via the clamp ring tool 260 to screw on and off the attachment thread 93, utilizing the power torque wrench's 90 torque output as may be well appreciated by anyone skilled in the art. This may conveniently assist to simply and accurately tighten the coupling unit 200 axially onto the torque wrench housing 92.

Figure 8:
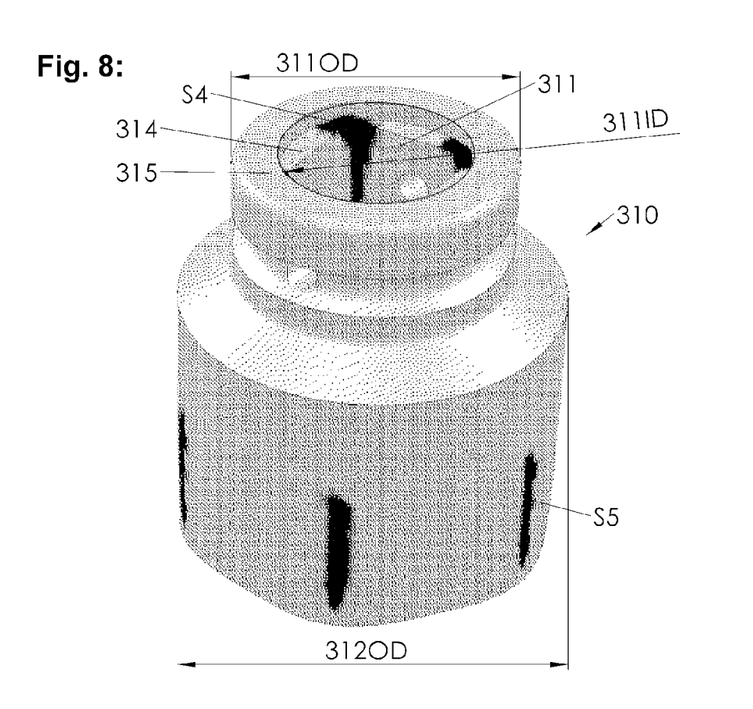
FIG. 8 is the fourth perspective view of an actuation socket stress simulation depicted with scaled deformation of the present invention with peak stress areas axially offset and with rupture initiation sites being eliminated.
Figure 9:
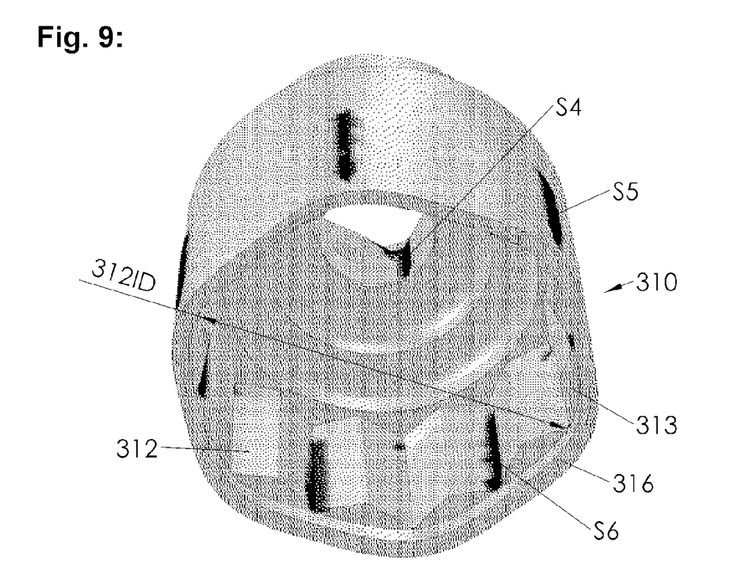
FIG. 9 is a dithered line shaded fifth perspective view of FIG. 8.

Referring also to FIGS. 8, 9, the actuation socket 310 has a socket top face 315 and socket bottom face 316. Accessible via the socket top face 315 is first profiled cavity 311 and via said socket bottom face 316 is a second profiled cavity 312. The first profiled cavity 311 may have a well known first torque transfer contour such as but not limited to a square that is mating the drive square 95. The second profiled cavity 312 may have a second torque transfer contour such as but not limited to a well known hex, double hex, square, double square or triple square that is mating a well known actuation receiving contour 5 of a nut and/or bolt head 1. Edge stress dispersing recesses 313, 314 are provided in between socket faces 315, 316 and respective profiled cavities 311, 312. The edge stress dispersing recesses 313, 314 are substantially corner free and preferably circular with respective radii 313R, 314R and are preferably concentric around the torque transfer axis 100A and that propagate circumferentially continuous around their respective profiled cavities 311, 312.

Around the first profiled cavity 311, the actuation socket 310 may have a thick wall configuration with a first outer socket diameter 311OD that is at least fifteen percent larger than a maximum first profiled cavity diameter 311ID at least in the vicinity of the edge stress dispersing top recess 314. There, the stress dispersion recess depth 314H may be down to a half the difference between first outer socket diameter 311OD and maximum first profiled cavity diameter 311ID. This may be, because in a thick wall configuration, top peak stress areas S4 occur mainly on the inside and along the peripheral edges of the first profiled cavity as is shown in FIG. 8. The edge stress dispersing top recess 314 primarily acts to prevent any eventual fractures in the corner regions of the first profiled cavity from propagating radially any further outward.

Around the second profiled cavity 312, the actuation socket 310 may have a thin wall configuration with a second outer socket diameter 312OD that is less than fifteen percent larger than a maximum second profiled cavity diameter 312ID at least in the vicinity of the edge stress dispersing bottom recess 313. There, the stress dispersion recess depth 313H is preferably more than half the difference between second outer socket diameter 312OD and maximum second profiled cavity diameter 312ID. This may be, because in a thin wall configuration, peak stress areas occur on the inside of the second profiled cavity and on the outside the actuation socket resulting from entire cross section deformation as shown in FIG. 9. The edge stress dispersing bottom recess 313 primarily acts to axially offset away from the actuation socket bottom 316 bottom peak stress areas S5, S6 that may occur on the actuation socket 310 outside and the second profiled cavity 312 surface. The radius 313R of the edge stress dispersing bottom recess 313 may be equal to the bottom flange radius 327R of the reaction socket 320. As a favorable result of edge stress dispersing recesses 313, 314, outer socket diameters 311OD, 312OD may be substantially reduced, which in turn may substantially contribute in keeping overall system bottom diameter 100BOD and overall system top diameter 100TOD to a minimum and substantially within well known radial outside diameter limits of prior art actuation sockets operated without simultaneous concentric reaction torque transfer as may be well appreciated by anyone skilled in the art.

An actuation receiving structure 1 may be tightened or loosened by use of system 100, by attaching in an initial step the coupling unit 200 to a power torque wrench 90 via optional clamp ring 230 that may be actuated by the power torque wrench 90 via the clamp ring tool 260. Next is selected a socket unit 300 including an actuation socket 310 that matches with its second profiled cavity 312 the actuation receiving profile 5 of the nut or bolt head 1. The socket unit 300 may be slid over the drive shaft 95 with the first profiled cavity 311 until the reaction socket 320 snap connects with the coupling unit 200 without need to employ any well known safety pin between the power torque wrench's 90 coupling pin hole 98 and the actuation socket 310. This may substantially reduce time and effort to connect varying sizes of coupling units 300.

Once the socket unit 300 is snap connected with the coupling unit 200, the snap lock screws 244 may be set and the socket unit 300 secured on the coupling unit 200. Then, the second profiled cavity 312 is fitted around the nut or bolt head 1 and the torque inducing structures 322 interlocked with the torque receive structures 25. The system 100 may then be secured by rotating the lock ring 330 into lock-on orientation. Once the well known actuation torque is being transferred from the torque wrench shaft 95 onto the nut or bolt head 1, via the actuation socket 310, the reaction torque is transferred concentrically from the torque wrench housing 92 onto the reaction washer 10 via the coupling unit 200 and the reaction socket 320. Once the tightening is completed, the lock-on ring 330 may be rotated into release orientation and the system 100 together with the power torque wrench 90 removed from the reaction washer 10 and the nut or bolt head 1. Similarly and as may be well appreciated by anyone skilled in the art, a loosening operation may be performed.

For the purpose of ease of understanding, a nomenclature is added in the following:
1 actuation receiving structure/nut and/or bolt head
1R receiving structure outer radius
4 thread stud
4R bolt head transition radius
4P thread pitch
5 actuation receiving contour
6 base 7 base surface
10H initial bite depth
11 central through hole
11D center hole diameter
11H centering shaft
11R top edge clearance
12 washer bottom side
13 washer top side
14 initial load receive top face
17 bearing bottom face/washer rest surface
17D peripheral bottom circumference
18 central bearing rim
20 bottom serrations
21D peripheral initial indentation diameter
25 torque receive structures
25B torque receive structure bottom
25BA bottom angle
25D outer receive structure diameter
25R outer centering feature
25T outer receive structure thickness
26 receive structure top
27 bidirectional bite edge
27E peripheral bite edge ends
27H bite depth/indentation offset
28 evacuation grooves
29 torque receive face
29A radial friction angle
29C receive face structure angle
29G receive face gap angle
35 base flange
35D base flange diameter
35A common bottom cone angle
35R base centering feature
35T base thickness
36 clearance undercut
36H undercut height
36W undercut width
37 centering shoulder/peripheral bottom circumference
39 base flange top
40 base flange bottom
40A flange bottom cone angle
50 stiction ring
50H stiction height
50W stiction ring width
51H vertical stiction offset
51W horizontal stiction offset
90 power torque wrench
91 external spline
92 torque wrench housing
93 attachment thread
95 drive shaft
98 coupling pin hole
100 lock-on reaction torque transfer system
100A torque transfer axis
100TOD overall system top diameter
100BOD overall system bottom diameter
200 coupling unit
210 adapter flange
211 adapter spline
212 hand groove
213 bottom channel
214 thread holes
215 adapter bottom face
216 axial lock shoulder
217 adapter top seal groove
220 coupling body
221 coupling body top face
222 socket coupling castles
223 snap arc retention lip
224 adapter flange screws
225 screw head channel
226 adapter flange screw heads
227 shear balls
228 arc guiding grooves
229 contact rim
230 clamp ring
231 tool pin holes
232 clamp thread
240 snap arc
241 clearance arc recess
242 screw access arc holes
243 release button
243C release access clearance
244 snap lock screw
246 button connect screw
247 snap arc spring
255 screw access cover holes
256 snap arcs cover
257 cover screws
260 clamp ring tool
261 coupling pins
265 drive shaft adapter
300 socket unit
310 actuation socket
311 first profiled cavity/actuation receptacle
311OD first outer socket diameter
312 second profiled cavity/actuation cavity
312OD second outer socket diameter
313 edge stress dispersing bottom recess
313H bottom recess depth
314 edge stress dispersing top recess
314H stress dispersion recess depth
315 first socket end/actuation socket top
316 second socket end/actuation socket bottom
318 retention shoulder
320 reaction socket
321 interface coupling castles
322 torque inducing structures
323 lip protection rim
324 peripheral enforcement taper
324C outer taper silhouette
325 central torque inducing face
326 radial stone hole
327 bottom flange
328 snap groove
329 outer cone face
330 lock-on ring
331 lock-on clearance angle
332 bridging crown
333 lock-on lip
333C lip bottom clearance
334 grip serrations
335 internal groove arc
336 stop through holes
337C lock-on clearance
338 bridging crown
339 open crown contour
340 sliding stone
350 axial bottom socket bushing
351 upper radial seal ring
352 stone push ring
353, 353A, 353B orientation marker Accordingly, the scope of the present invention is set forth by the following claims and their legal equivalent:

What is claimed is:

1. An actuation socket comprising:
   a. a socket face at least at one of a bottom and a top of said actuation socket;
   b. a profiled cavity that is accessible via said socket face and that is extending inside said actuation socket, said profiled cavity having a torque transfer contour; and
   c. an edge stress dispersion recess in between said socket face and said profiled cavity, wherein said edge stress dispersion recess propagates circumferentially around said profiled cavity.

2. The actuation socket of claim 1 comprising:
   a. a thick socket wall configuration with an outer socket diameter being at least fifteen percent larger than a maximum contour diameter at least in the vicinity of said stress dispersion recess; and
   b. a stress dispersion recess depth that is down to a fraction of half a difference between said outer socket diameter and said maximum contour diameter.

3. The actuation socket of claim 1 comprising:
   a. a thin socket wall configuration with an outer socket diameter being less than 15% larger than a maximum contour diameter at least in the vicinity of said stress dispersion recess; and
   b. a stress dispersion recess depth that is more than a half difference between said outer socket diameter and said maximum contour diameter.

4. The actuation socket of claim 1, wherein said actuation socket is part of a reaction washer based actuation and reaction torque transfer system further comprising a reaction socket that is encompassing said actuation socket.

5. The actuation socket of claim 4, wherein said reaction washer based actuation and reaction torque transfer system further comprises a lock-on ring that is encompassing said reaction socket.

* * * * *